(12) United States Patent
Shiba

(10) Patent No.: US 7,109,666 B2
(45) Date of Patent: Sep. 19, 2006

(54) LIGHTING DEVICE FOR A DIELECTRIC BARRIER DISCHARGE LAMP

(75) Inventor: Toshiaki Shiba, Ehime (JP)

(73) Assignee: Harison Toshiba Lighting Corporation, Ehime (JP)

( * ) Notice: Subject to any disclaimer, the term of this patent is extended or adjusted under 35 U.S.C. 154(b) by 55 days.

(21) Appl. No.: 10/924,258

(22) Filed: Aug. 24, 2004

(65) Prior Publication Data
US 2005/0093478 A1    May 5, 2005

(30) Foreign Application Priority Data
Aug. 26, 2003   (JP)   ............................. 2003-301484

(51) Int. Cl.
*H05B 37/02* (2006.01)
*G05F 1/00* (2006.01)

(52) U.S. Cl. ...................... 315/224; 315/246; 315/291; 315/307; 315/DIG. 4

(58) Field of Classification Search ................ 315/219, 315/224, 225, 226, 276, 283, 291, 307, DIG. 4, 315/DIG. 7, DIG. 5, 246; H05B 37/02; G05F 1/00
See application file for complete search history.

(56) References Cited

U.S. PATENT DOCUMENTS 5,583,402 A * 12/1996 Moisin et al. .............. 315/307
6,084,360 A * 7/2000 Yokokawa et al. ......... 315/287
6,583,568 B1 * 6/2003 O'Meara .................... 315/194
6,788,006 B1 * 9/2004 Yamamoto .................. 315/219

* cited by examiner

*Primary Examiner*—Thuy Vinh Tran
(74) *Attorney, Agent, or Firm*—Banner & Witcoff, Ltd.

(57) ABSTRACT

A lighting device for dielectric barrier discharge lamp according to the embodiment of the present invention includes a pulse number judging circuit 16. The judging circuit 16 is supplied with a dimming control signal LCS designating a dimming ratio of a discharge lamp as an input signals and judges a number of the drive signal pulses per unit time corresponding to the dimming ratio from the dimming control signal LCS. The judging circuit 16 then outputs the result as the pulse number setting signal. The lighting device includes a drive signal generating signal 18, which is supplied with the pulse number setting signal and outputs the drive signal pulse of the prescribed number of pulse per unit time designated by the number of the pulse setting signal. The lighting device further includes an inverter circuit 10, which is supplied with the output of the drive signal generating circuit 18 and generates HF pulse for driving the dielectric barrier discharge type fluorescent lamp.

8 Claims, 12 Drawing Sheets

PRIOR ART : DRIVE SIGNAL 20 kHz, DIMMING RATIO 2.0%

Fig.8 PRIOR ART : DRIVE SIGNAL 20 kHz , DIMMING RATIO 2.0%

US 7,109,666 B2

LIGHTING DEVICE FOR A DIELECTRIC BARRIER DISCHARGE LAMP

BACKGROUND TECHNOLOGY OF THE INVENTION

The present invention relates to a back light source for liquid crystal display device used for personal computers and car navigation systems, and particularly to a lighting device for dielectric barrier discharge lamp suited for the back light source.

Conventionally, cold cathode fluorescent lamps enclosed with mercury have been used for back light sources for liquid crystal display device. FIG. 1 shows a waveform for driving a lamp, i.e. a lamp voltage waveform and a current waveform of a cold cathode fluorescent lamp enclosed with mercury operated under a low dimming control ratio (1%). In case of the fluorescent lamp enclosed with mercury, the waveforms of the lamp voltage and the current are generated in a period W corresponding to the dimming control ratio of 1%, using signals of high level (H) period of dimming control signal LCS corresponding to the dimming control ratio of 1% as shown in FIG. 1. In case of the fluorescent lamps enclosed with mercury, even if initial waveform distortion or residual waveform existed a little in the vicinity of the period W, the lamp light did not show flickering. This is because mercury is lighter than xenon in weight and it can move freely inside the glass tube in wide range. As a result, if a lamp voltage having a little distorted waveform is supplied to a fluorescent lamp enclosed with mercury, a phenomenon of the flickering of the lamp hardly took place because ultraviolet ray emitted from mercury atom diffuses widely.

Because mercury has a very high conversion efficiency of light compared with rare gas such as xenon, there is an advantage that enclosing a minute amount of mercury in the glass tube is sufficient.

However, in recent years, a dielectric barrier discharge type cold cathode fluorescent lamp using rare gas with no mercury contained, which is a hazardous substance, has been developed. One example of the lighting device for lighting such rare gas fluorescent lamps is explained using FIG. 2 to FIG. 8.

FIG. 2 and FIG. 3 are a side view and a longitudinal sectional view respectively showing a construction of an external electrode type fluorescent lamp which is a type of dielectric barrier discharge lamp. The external electrode type fluorescent lamp 11 is provided with a glass tube 1, inside which a discharge medium containing at least xenon is enclosed, and on an inner wall of which a phosphor 2 is provided. On at least one end of the glass tube 1, an inner electrode 4 is sealed with a lead-in wire 3 being connected. Around an outer surface of the glass tube 1, an electrically conductive wire is wound spirally as an external electrode 5. The external electrode 5 is coated with a translucent heat shrinkage tube 6 and is fixed on the outer surface of the glass tube 1. The inner electrode 4 is connected with a power supply wire 8 through a lead-in wire 3, and the external electrode 5 is connected with a power supply wire 8' through a fixing metal bar 7. The external electrode type fluorescent lamp 11 starts discharging, when it is supplied high frequency pulses alternating between positive and negative voltages, which is applied between the inner electrode 4 and the external electrode 5 from an HF power source device 9 through power supply wires 8, 8'. The HF power source device 9 is composed of inverters, for example. Thus the external electrode type fluorescent lamp 11 emits an ultraviolet ray from xenon. The ultraviolet ray is then converted into a visible light by phosphor 2 and is used as a light source.

FIG. 4 and FIG. 5 are block diagrams showing a circuit configuration of the HF power source device 9 for lighting the external electrode type fluorescent lamp 11. The HF power source device 9 includes an inverter circuit 10, which converts a DC voltage into an AC pulse signal. In the inverter circuit 10, the external electrode type fluorescent lamp 11 is connected with the secondary coil of the transformer T1. Capacitors C1 and C2 for providing center bias are connected with one end of the primary coil. The capacitors C1 and C2 are connected in series between a DC source Vcc and a ground (GND), and the connecting point of the capacitors C1 and C2 is connected with the end of the primary coil of the transformer T1. Semiconductor switching elements S1 AND S2 and circuit elements Z1, Z2 are connected in series also between the DC source Vcc and the GND. Another end of the primary coil of the transformer T1 is connected with the connecting point of circuit elements Z1 and Z2. The circuit elements Z1 and Z2 are composed of coils, diodes, and some other elements having resistance components such as resistors or group of elements formed by combining them.

The semiconductor switching elements S1 and S2 are supplied with driving signals P1 and P2 produced by a drive signal generating circuit 12 through dimming control circuit 13, thereby performing respectively the switching control by these driving signals. The drive signals P1 and P2 have phases different from each other by 180° and have an equal repetition cycle t. The dimming control circuit 13 is a gate circuit which controls the number of drive signals P1 and P2 passing through it in a time period T defined by the dimming control signal LCS. When drive signals P1 and P2 are supplied to semiconductor switching elements S1 and S2, the semiconductor switching element S1 is turned OFF and the semiconductor switching element S2 is turned ON. Then, positive lamp current IA flows along a pass shown by a dotted line in FIG. 4. In the next cycle of the drive signals P1 and P2, the semiconductor switch S1 is turned OFF and the semiconductor switch S2 is turned ON. Then, negative lamp current IB flows along a pass shown by a dotted line in FIG. 5.

That is, when the voltage at the primary coil of the lamp drive transformer T1 is changed in a manner as L→H→L→H→L→H . . . , in accordance with the ON period of the drive signal P1, and drive signal P2, positive and negative lamp current are supplied to the external electrode type fluorescent lamp 11 connected with the secondary coil of the transformer T1, thereby lighting the fluorescent lamp 11 as shown in the timing chart of FIG. 6 and FIG. 7. By repeating the operations, a square wave voltage is supplied to the lamp 11 continuously. As a result, positive and negative lamp currents are applied continuously to the external electrode type fluorescent lamp 11 using the rare gas, thereby achieving the lighting of the lamp with high luminance.

Here, generally, the lighting device is provided with a dimming control device which controls the luminance of the lamp according with the surrounding area. The luminance of a lamp adjusted by the dimming control device is indicated by a dimming control ratio. The dimming control ratio is indicated by an arbitrary luminance to the maximum luminance of the lamp in %.

The dimming control signal 14 shown in FIG. 4 and FIG. 5 is a so called pulse width modulation signal in which a pulse width is changed in according with the dimming control ratio. In control circuit 13, switches S3 and S4 are closed only in H (high) voltage period of the dimming control signal 14 and supplies drive signals P1 and P2 generated in the drive signal generating circuit 11 to the semiconductor switching elements S1 and S2. The switches S3 and S4 are opened in the L (low) voltage period and the drive signals P1 and P2 are not supplied to semiconductor switching elements S1 and S2. Here, the period of the high voltage (H) of the dimming control signal becomes maximum when the dimming control ratio is 100%, and it becomes narrow in accordance with the dimming control ratio. As a result, a different numbers of the drive pulses in a fixed period are provided as the drive pulse signals P1 and P2 from the control circuit 13 in accordance with the dimming control ratio.

Here, the conventional HF source device 9 is difficult to use in circumstance where a stable lamp operation is required, since the flickering is prominent when the barrier discharge lamp using a rare gas without containing mercury operated at a low dimming control ratio of 25% or lower. The present inventors investigated the cause of the flickering and finally found that distortions in the waveform or variation in repetition cycle of the drive signal P1 and P2 cause the phenomenon, which will be explained bellow.

FIGS. 6–8 are timing charts showing the waveforms of the lamp drive signal P1 and P2 in HF source device 9. In the figures, the timing chart shows the waveforms when the repetition frequency of the lamp drive signal P1 and P2 is 20 kHz respectively and the dimming control ratio is 2%. Here, the fact that the lamp drive frequency (=f) is 20 kHz means that the repetition cycle t of the drive signal P1 and P2 is 50 μs. Now, if an unit time is chosen as 10 ms (where the repetition cycle is 100 Hz), numbers of pulse per unit time is 200. Hereinafter, the unit time is called as the dimming control signal cycle or terminal T. That is, when the dimming control ratio is 100%, 200 pulses per 1 cycle T of the dimming control signal are repeatedly supplied to the lamp 12 at 100 Hz frequency as the drive pulse P1, P2. Therefore, when the dimming control ratio is 2.0%, 4 pulses per 1 cycle of the dimming control signal are supplied to lamp 12 at 100 Hz frequency. The drive signal P1 and P2 have phases different from each other by 180°. Thus the drive signal P1 is in H level when the drive signal P2 is in L level, and on the contrary the drive signal P1 is in L level when the drive signal P2 is in H level. However, in the waveform of the drive signal P2 shown in FIG. 6, a lack portion A-1 is generated in the first pulse waveform of the drive signal P2 in the first period T(1) of the dimming control signal. As a result, a lack portion A-2 is generated in the lamp current waveform $I_{L1}$ shown in FIG. 6. Further, in the second period T(2) of the dimming control signal, a lacking portion B-1 at the last pulse waveform of the waveform of the drive signal P1 is generated, and a lacking portion B-2 is generated at the portion corresponding to the lamp current waveform $I_{L1}$. Here, in this case, lacking portions A-3, B-3 are generated at the corresponding portion of the waveform of the primary coil voltage V1 of the lamp drive transformer T1.

In the timing chart of FIG. 7, it is shown that the waveforms of lamp drive signal P1 and P2 start earlier by a time period of (t+α) compared with the period t of 1 cycle of the lamp drive signal P1 and P2 in the second period of the light dimming control signal. Here, the variation α of the start timing in the second period surpasses a range of −½×t~+½×t. As a result, both the waveforms of the voltage V1 in the primary coil of lamp drive transformer T1 and of the lamp current $I_{L1}$ start earlier by the period of (t+α) in the second period of the dimming control signal.

FIG. 8 shows a timing chart, in which the phases of lamp drive signal P1 and P2 waveform themselves vary at each repetition cycle t and the variation exceeded the range of −⅒×t~+⅒×t. As a result, the primary coil voltage V1 of lamp drive transformer T1 and lamp current waveform $I_{L1}$ vary at each repetition cycle t respectively, the variation exceeds the range of −⅒×t~+⅒×t.

It becomes clear that the semiconductor switching elements S1 and S2 are ON/OFF controlled by the drive signals P1 and P2 containing such waveform distortion or cycle variation of dimming control signal. As a result, the similar waveform distortion or the variation in each cycle arises in the drive voltage waveform V1 of the external electrode type fluorescent lamp 11 connected with the secondary coil of the transformer T1, thereby occurring the flickering in the luminance of lamp 11.

On the contrary, the flickering of the lamp did not occur because the light emitting principle differs from that of the external electrode type fluorescent using the rare gas and free from mercury, when the fluorescent lamp containing mercury in the discharge gases is operated by the conventional HF source device 9, even if the distortion such as lack in the lamp drive waveform or fluctuation in the cycle of dimming control signal existed in such a low dimming region as 25% or lower.

The present invention is made to solve the technical problems in the conventional lighting device mentioned above. Therefore, one of the objects of the present invention is to provide a lighting device for dielectric barrier discharge lamps, which enables a stable lamp operation without flickering in lamp luminance at a low dimming ratio, such as of 25% or lower.

SUMMARY OF THE INVENTION

The lighting device for dielectric barrier discharge type discharge lamp according to one embodiment of the present invention includes a pulse number judging circuit. The pulse number judging circuit is supplied with a dimming control signal as an input signal, which designates dimming ratio of dielectric barrier discharge type fluorescent lamp. The pulse number judging circuit judges the number of drive signal pulses per unit time corresponding to the dimming ratio designated by the dimming control signal, and outputs the result as a pulse number setting signal. The lighting device further includes a drive signal generating circuit to which the pulse number setting signal outputted from the pulse number judging circuit is supplied, and outputs drive signal pulses having a prescribed number of pulses per unit time designated by the pulse number setting signal. The lighting device further includes an inverter circuit which generates HF pulse voltage for driving the dielectric barrier discharge type fluorescent lamp.

The lighting device for the dielectric barrier discharge lamp according to another aspect of the present invention includes a dielectric barrier discharge lamp having a discharge plasma space filled with rare gases, which generates excimer molecules by dielectric barrier discharge and having a structure in which a dielectric material lies between the rare gases and at least one of the two electrodes for inducing the discharge in the rare gases. The lighting device further includes a HF source device for periodically supplying the electrodes of the dielectric barrier discharge lamp with a prescribed number of high voltage pulses. The HF source device includes a pulse number judging circuit, which is supplied with a dimming control signal for designating the dimming ratio of the dielectric barrier discharge type discharge lamp as an input signal. The pulse number judging circuit judges the number of drive signal pulses per unit time corresponding to the dimming ratio designated by the dimming control signal and outputs the result as a pulse number setting signal. The HF source device further includes a drive signal generating circuit, which is supplied with the pulse number setting signal outputted from the pulse number judging circuit and outputs a drive signal pulse having prescribed number of pulses per unit time designated by the pulse number setting signal. The HF source device further includes an inverter circuit, which is supplied with the output of the drive signal generating circuit and generates HF pulse voltage for driving the dielectric barrier discharge type discharge lamp.

DETAILED DESCRIPTION OF THE INVENTION

Figure 1:
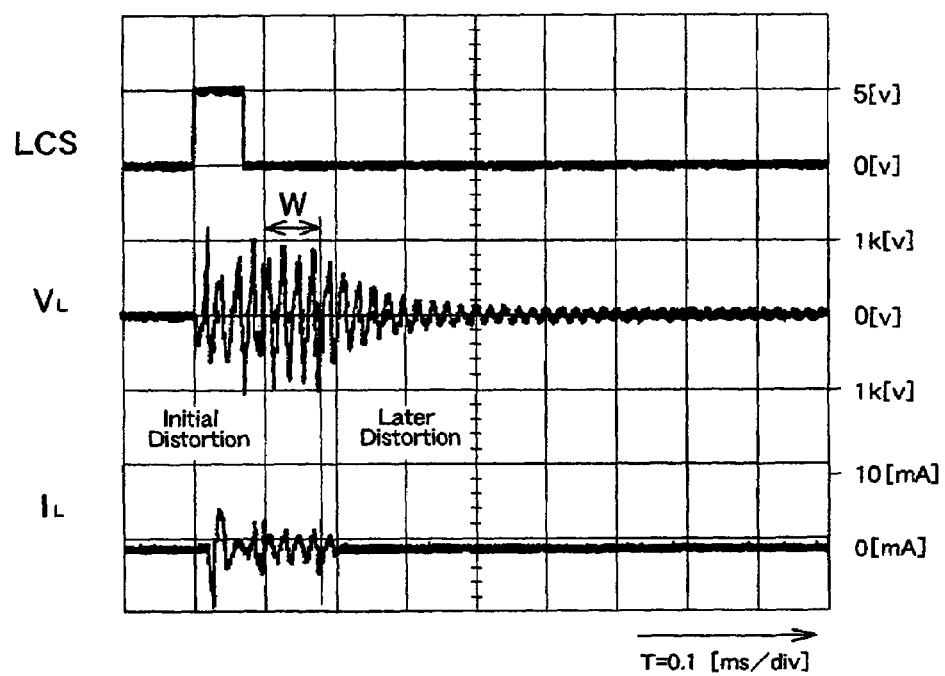
FIG. 1 is a experimentally measured waveform chart of the driving voltage and current for operating the conventional fluorescent lamp containing mercury at dimming ratio of 1%.
Figure 2:
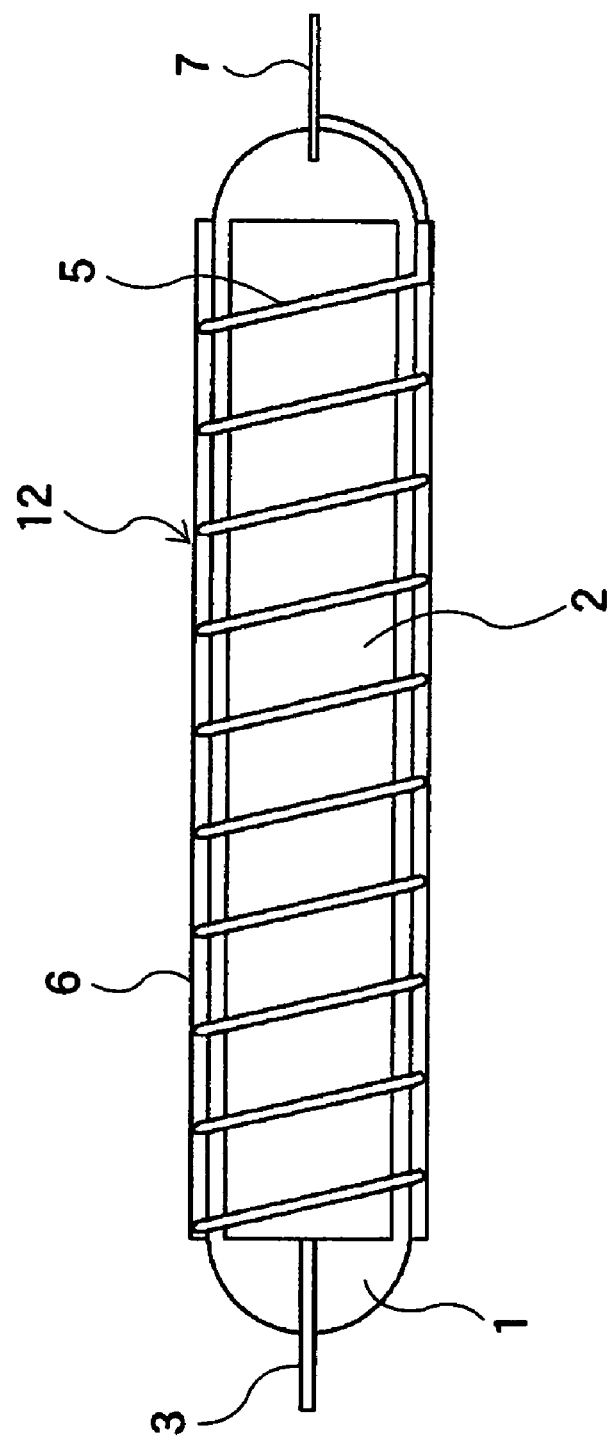
FIG. 2 is a diagram showing the conventional dielectric barrier discharge type fluorescent lamp using a rare gas.
Figure 3:
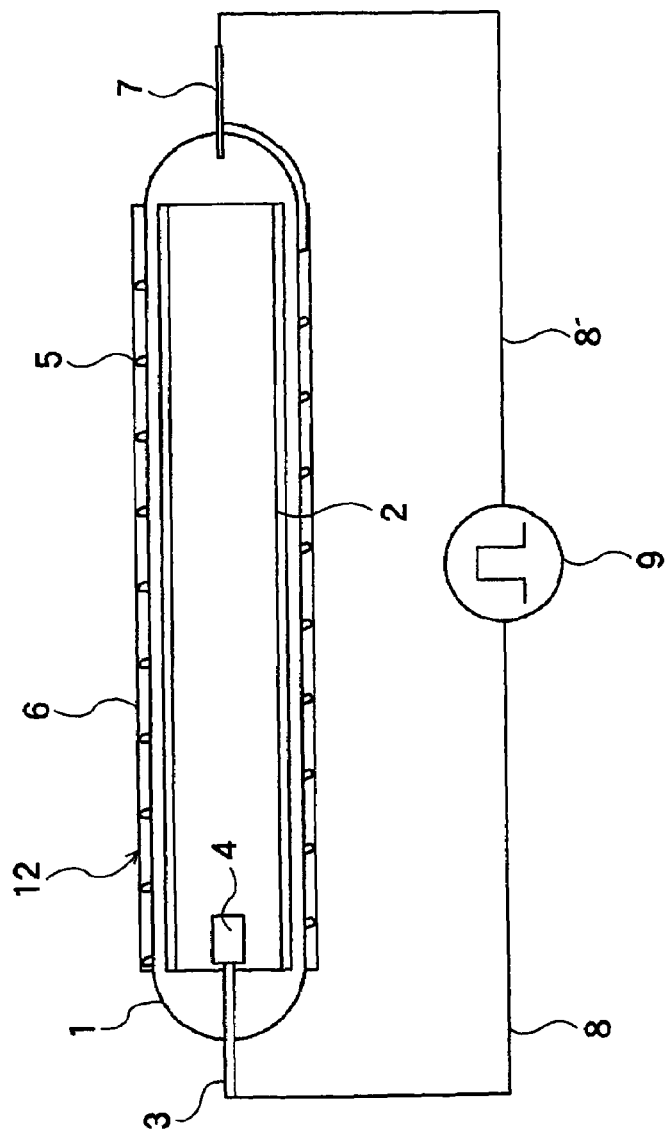
FIG. 3 is a longitudinal cross-section of the dielectric barrier discharge type fluorescent lamp shown in FIG. 2.
Figure 9:
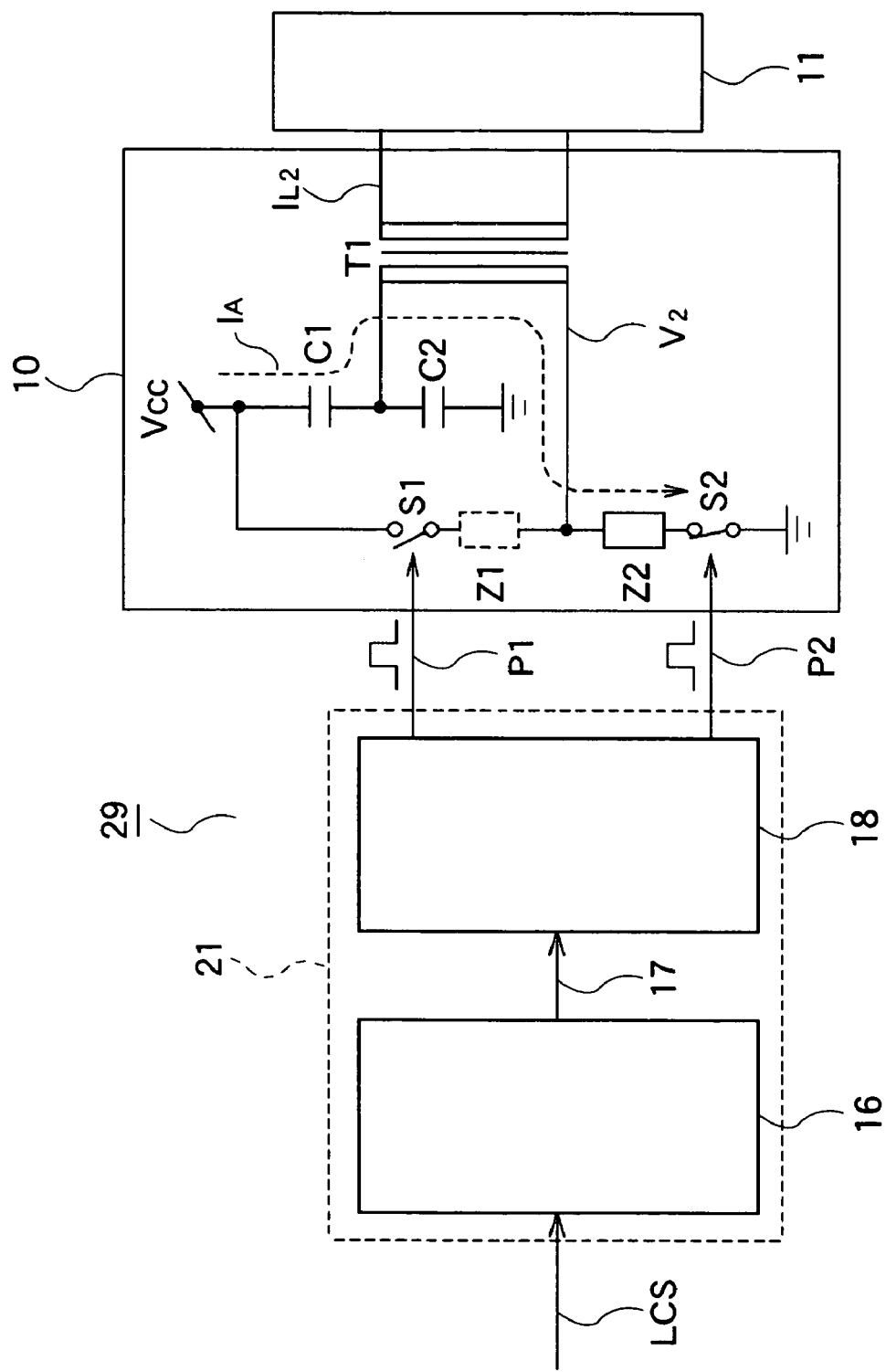
FIG. 9 is a block diagram showing a circuit configuration of the lighting device for a dielectric barrier discharge lamp according to one embodiment of the present invention.
Figure 10:
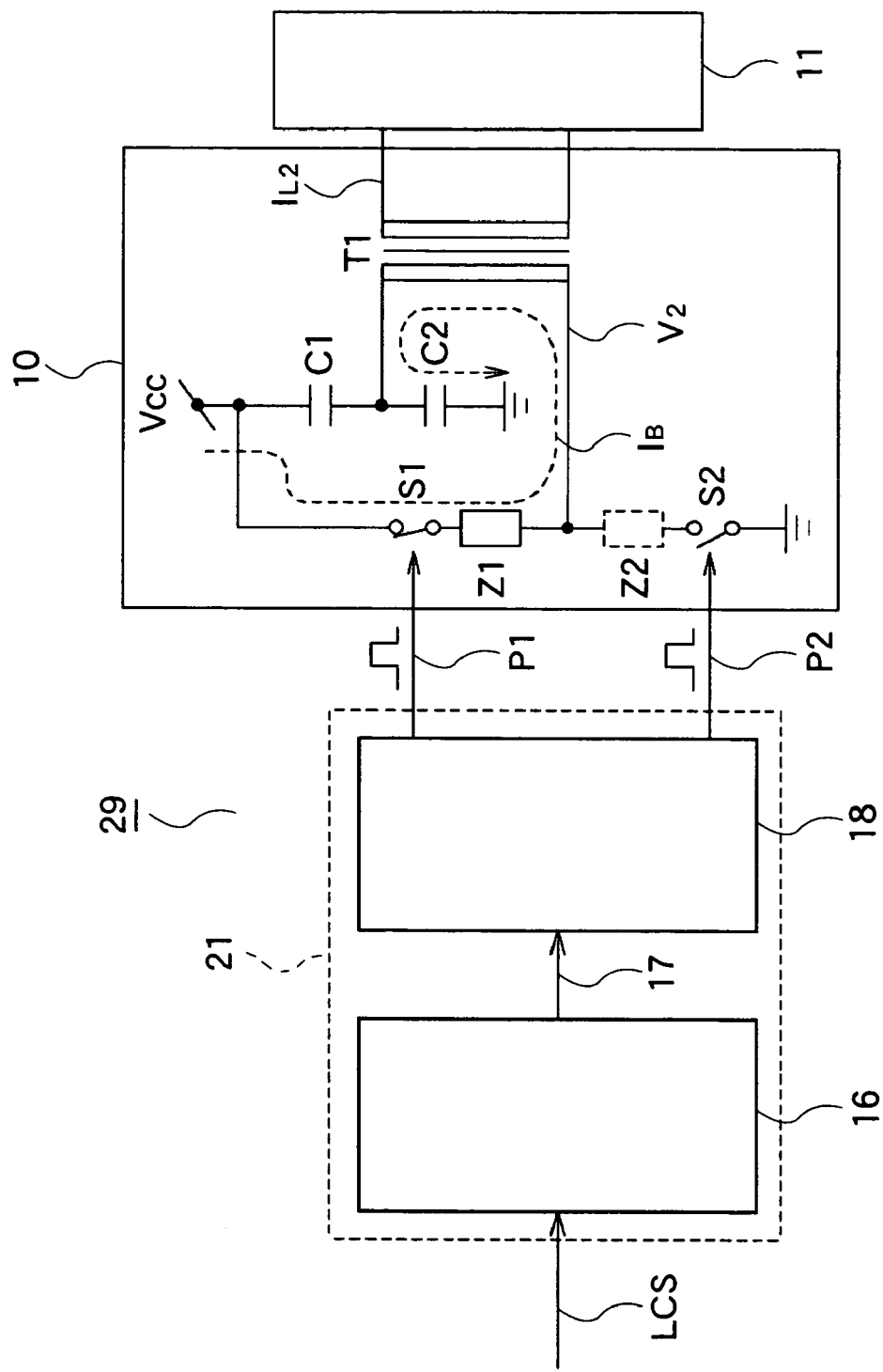
FIG. 10 is also a block diagram showing a circuit configuration of the lighting device for a dielectric barrier discharge lamp according to the embodiment of the present invention.
Figure 11:
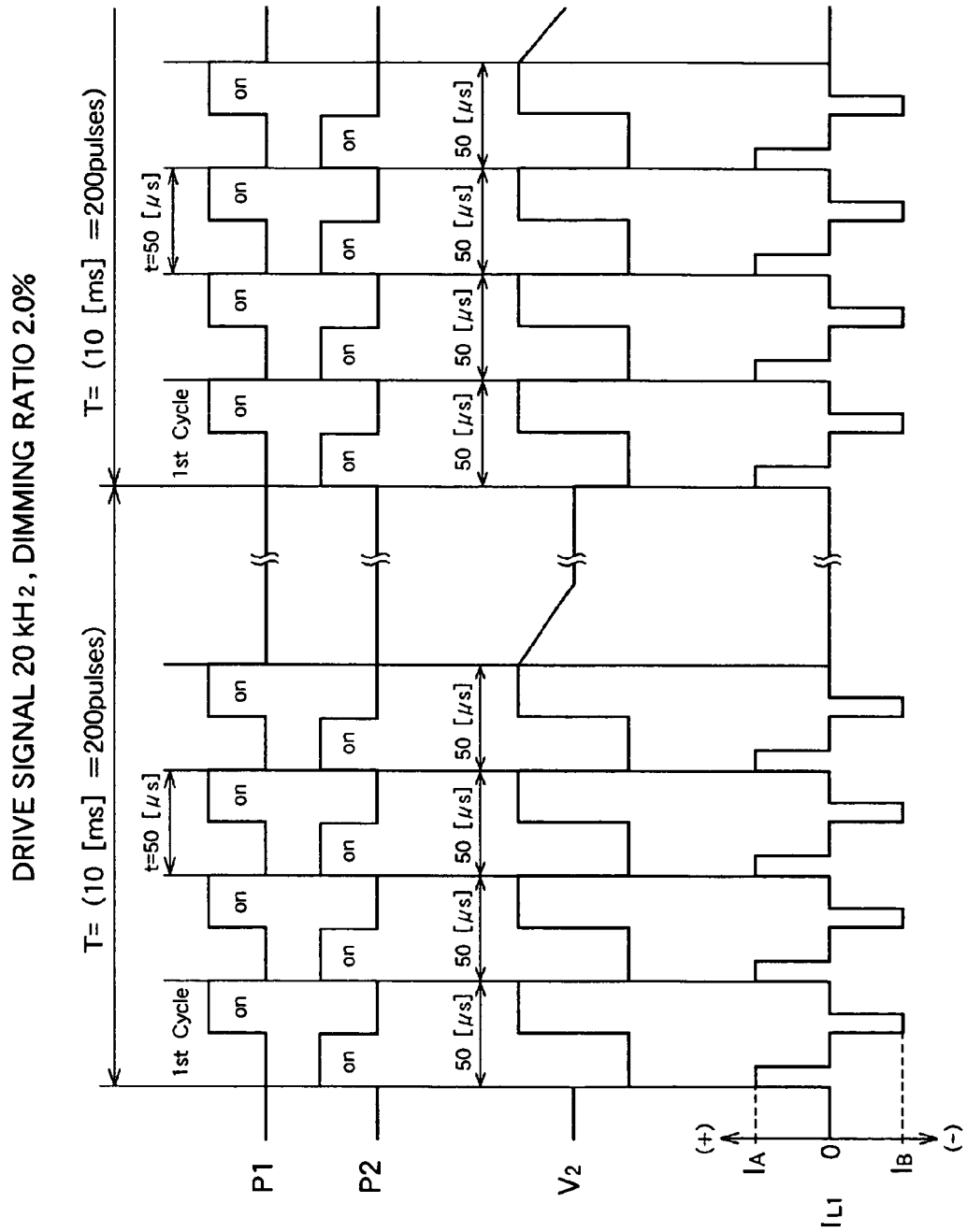
FIG. 11 is a timing chart showing the waveforms of the drive signal P1 and P2 in the embodiment of the present invention.

The embodiment of the present invention will be explained in detail with reference to the accompanying drawings. FIG. 9 and FIG. 10 are the block diagrams of a lighting device for a dielectric barrier discharge lamp according to one embodiment of the present invention. FIG. 11 is a timing chart showing a waveform of drive signals P1 and P2 in the lighting device. The dielectric barrier discharge lamp to be operated by the lighting device of the present invention is an external electrode type fluorescent lamp 11 using rare gas and is free of mercury, which is already shown in FIG. 2 and FIG. 3.

In HF source device 29 of the embodiment, a dimming control signal LCS which designates the dimming ratio of the dielectric barrier discharge type fluorescent lamp 11 is supplied to the pulse number judging circuit 16 as an input signal. The pulse number judging circuit 16 judges a number of the drive signal pulses per unit time corresponding to the dimming ratio from the dimming control signal LCS, and outputs the result as a pulse number setting signal 17. The pulse number setting signal 17 outputted from the pulse number judging circuit 16 is supplied to drive signal generating circuit 18, which then outputs the drive signal pulses P1 and P2 corresponding to the designated number of pulse per unit time designated by the pulse number setting signal 17. The output of the drive signal generating circuit 18 is supplied to an inverter circuit 10 which generates HF pulse voltage for driving the dielectric barrier discharge type fluorescent lamp 11.

The inverter circuit 10 is composed of semiconductor switching elements S1 and S2, circuit elements Z1 and Z2, capacitors C1 and C2 for center biasing, and a lamp drive transformer T. The inverter circuit 10 has nearly similar configuration to the conventional one shown in FIG. 4 and FIG. 5, so that detailed explanation is omitted to avoid duplications.

Next, the operation of the lighting device for dielectric barrier discharge lamp thus arranged will be explained referring to FIG. 11. Here, the operation will be explained for the case where the frequency of the drive signal P1 and P2 is 20 kHz respectively and the dimming ratio is 20% as is the case with the conventional one described.

Being supplied with the dimming control signal CSL as the input, the judging circuit 16 judges precisely the dimming ratio designated by the signal CSL and the number of pulses of drive signal P1 or P2 per unit time corresponding to the dimming ratio. The result of judging is supplied to the drive signal generating circuit 18 as the pulse number setting signal 17. The drive signal generating circuit 18 generates the drive signals P1 and P2 each having a number of the drive pulses corresponding to the pulse number setting signal 17 supplied. The drive signal generating circuit 18 controls the number of the pulses of the drive signal P1 and P2 per unit time precisely based on the pulse number setting signal 17 without missing any pulses. Here, a unit time means the period of 1 cycle T of the dimming control signal. The drive signal generating circuit 18 controls precisely so that the phase lag is not generated in the pulse waveform of the drive signal P1 and P2 included in the period of 1 cycle T of the dimming control signal CSL. Such control of drive signal P1 and P2 can be achieved with high accuracy and rather simply by forming the dimming control section 21 including the pulse number judging circuit 16 and drive signal generating circuit 18 with a micro computer or a specifically designed IC. As a result, a drive signal having an accurate number of pulses and a perfect waveform corresponding to the dimming control ratio can be obtained as shown in the waveform of the drive signal P1 and P2 in FIG. 11.

Figure 4:
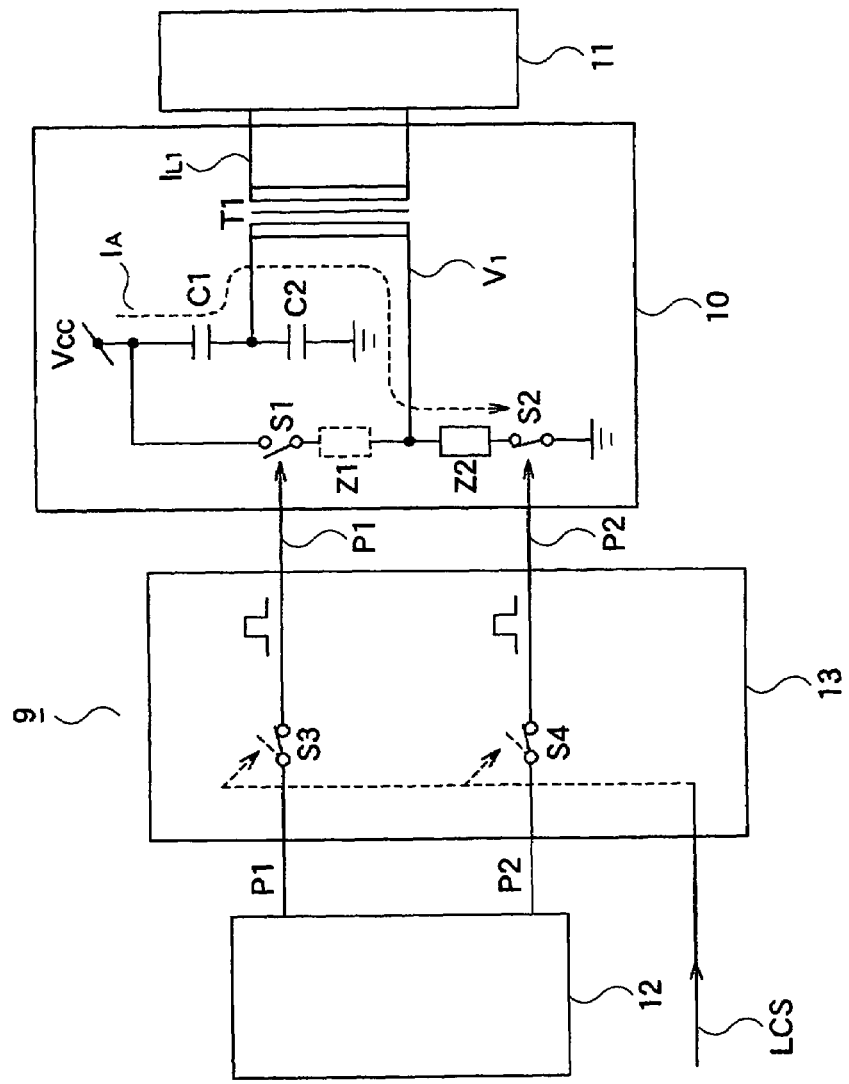
FIG. 4 is a block diagram showing a circuit configuration of the conventional lighting device for operating the dielectric barrier discharge type fluorescent lamp.
Figure 5:
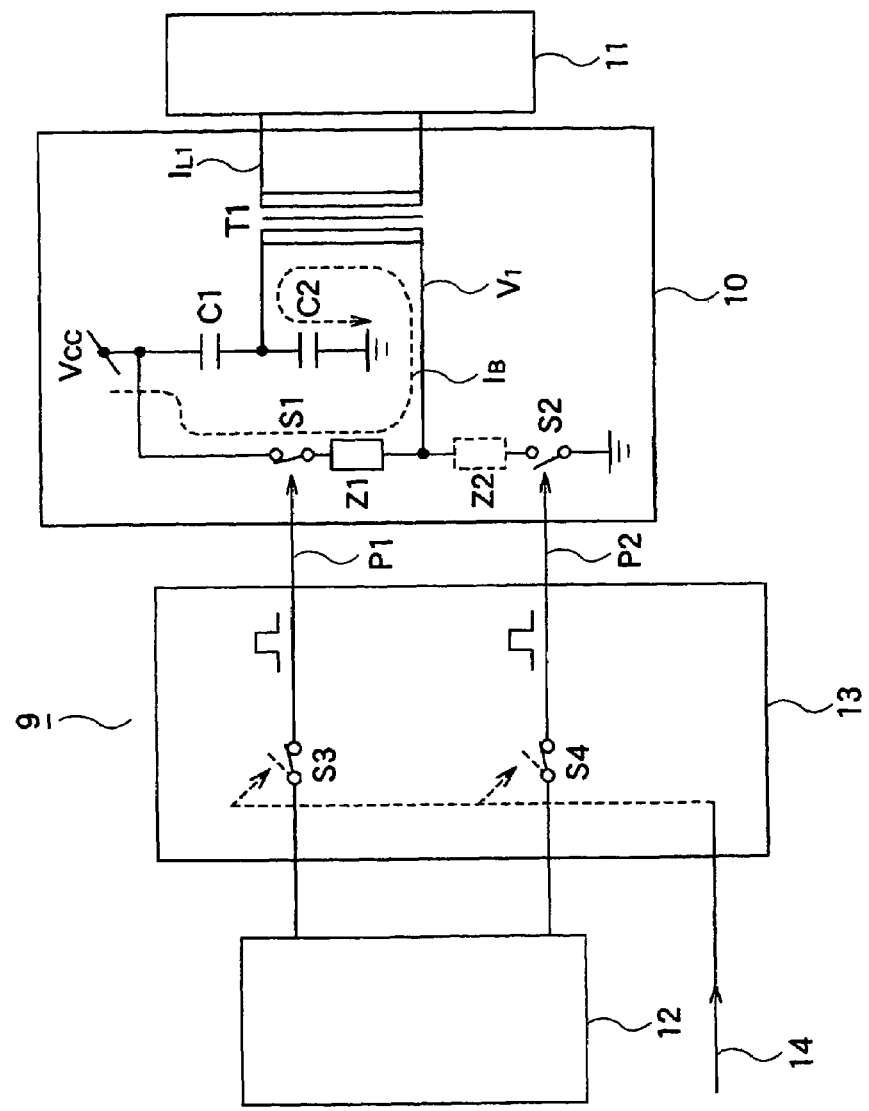
FIG. 5 is also a block diagram showing a circuit configuration of the conventional lighting device for operating the dielectric barrier discharge type fluorescent lamp.
Figure 6:
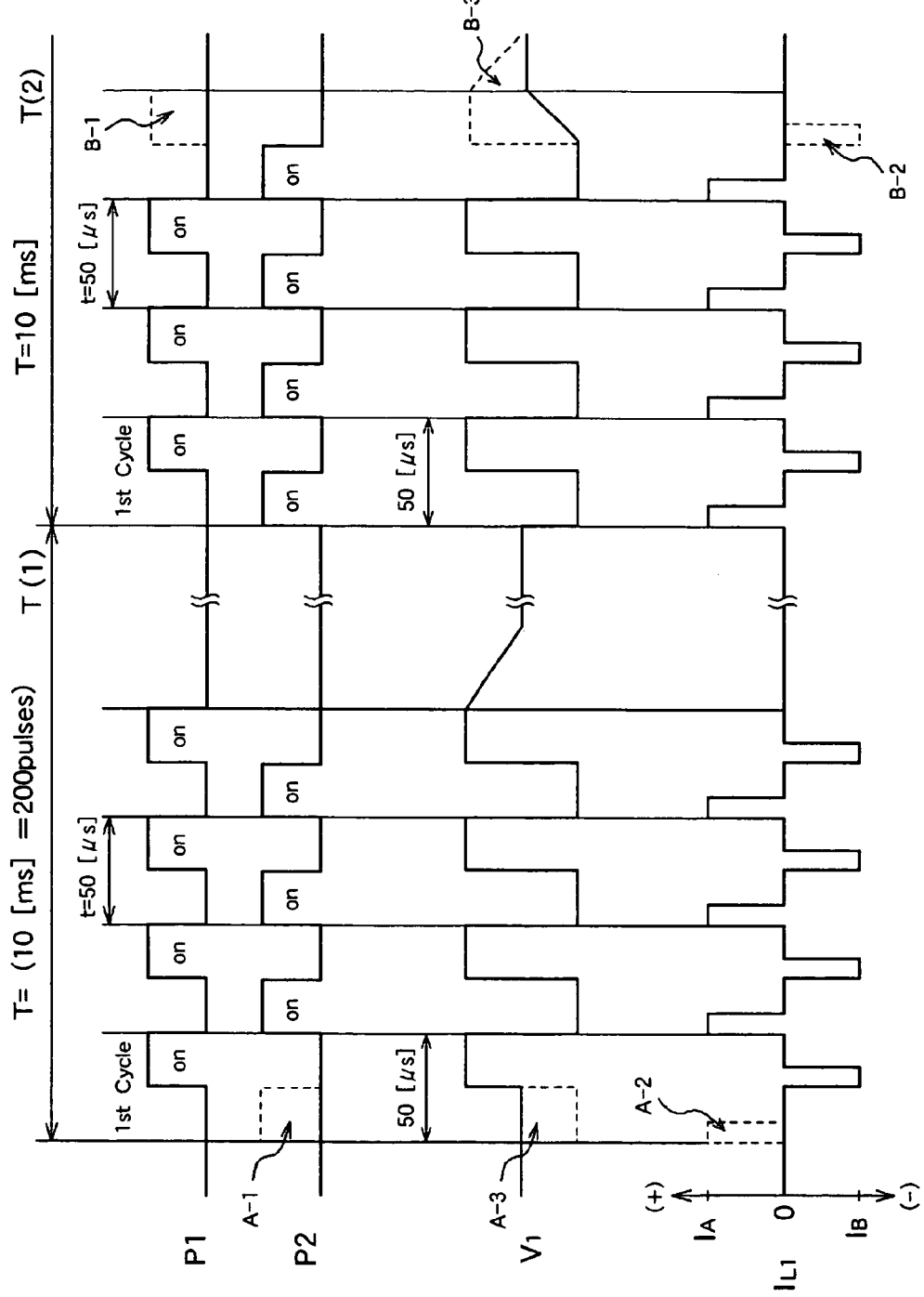
FIG. 6 is a timing chart showing waveforms of the drive signal P1 and P2 in the lighting device shown in FIG. 4 and FIG. 5.
Figure 7:
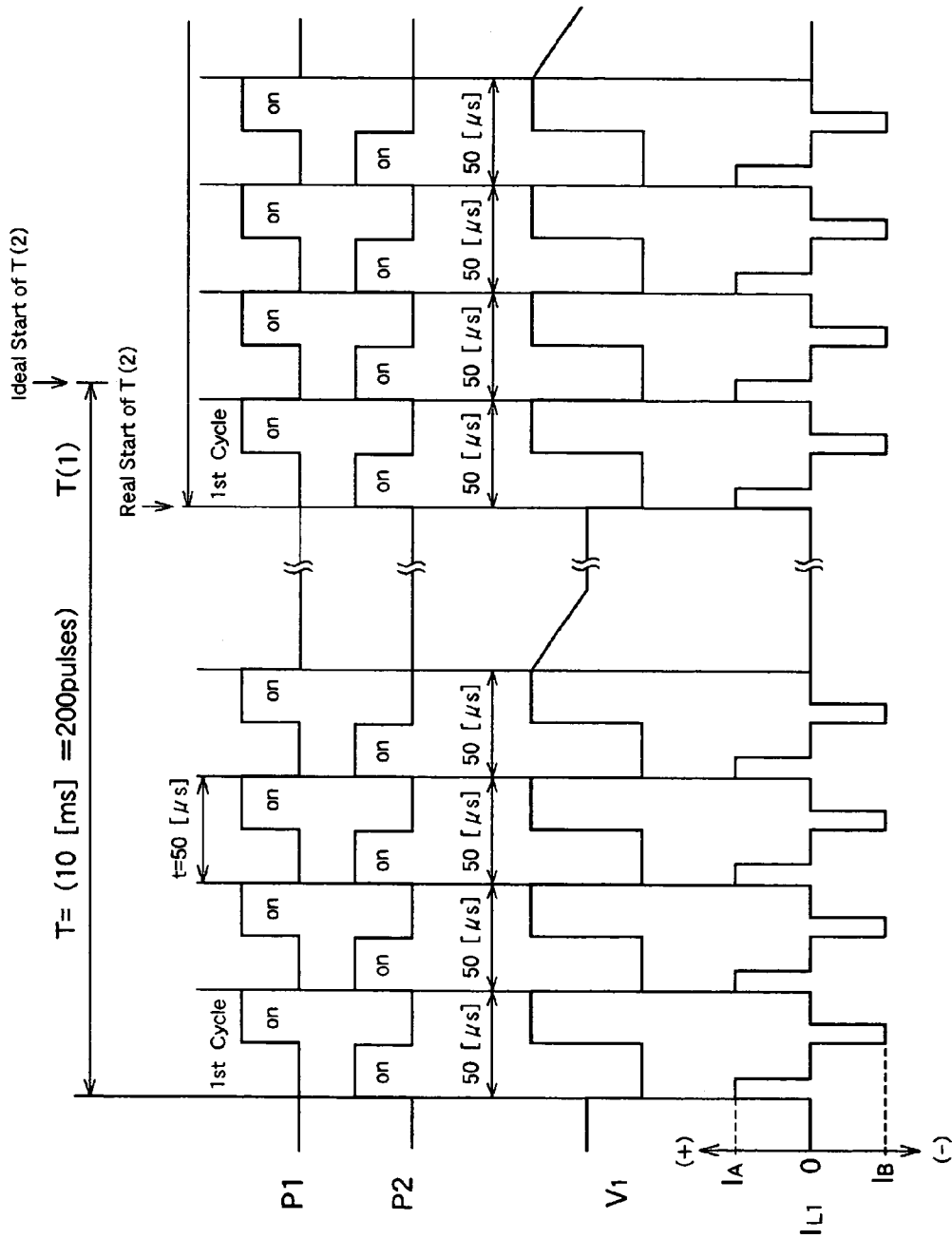
FIG. 7 is also a timing chart showing the waveforms of the drive signal P1 and P2 in the lighting device shown in FIG. 4 and FIG. 5.
Figure 8:
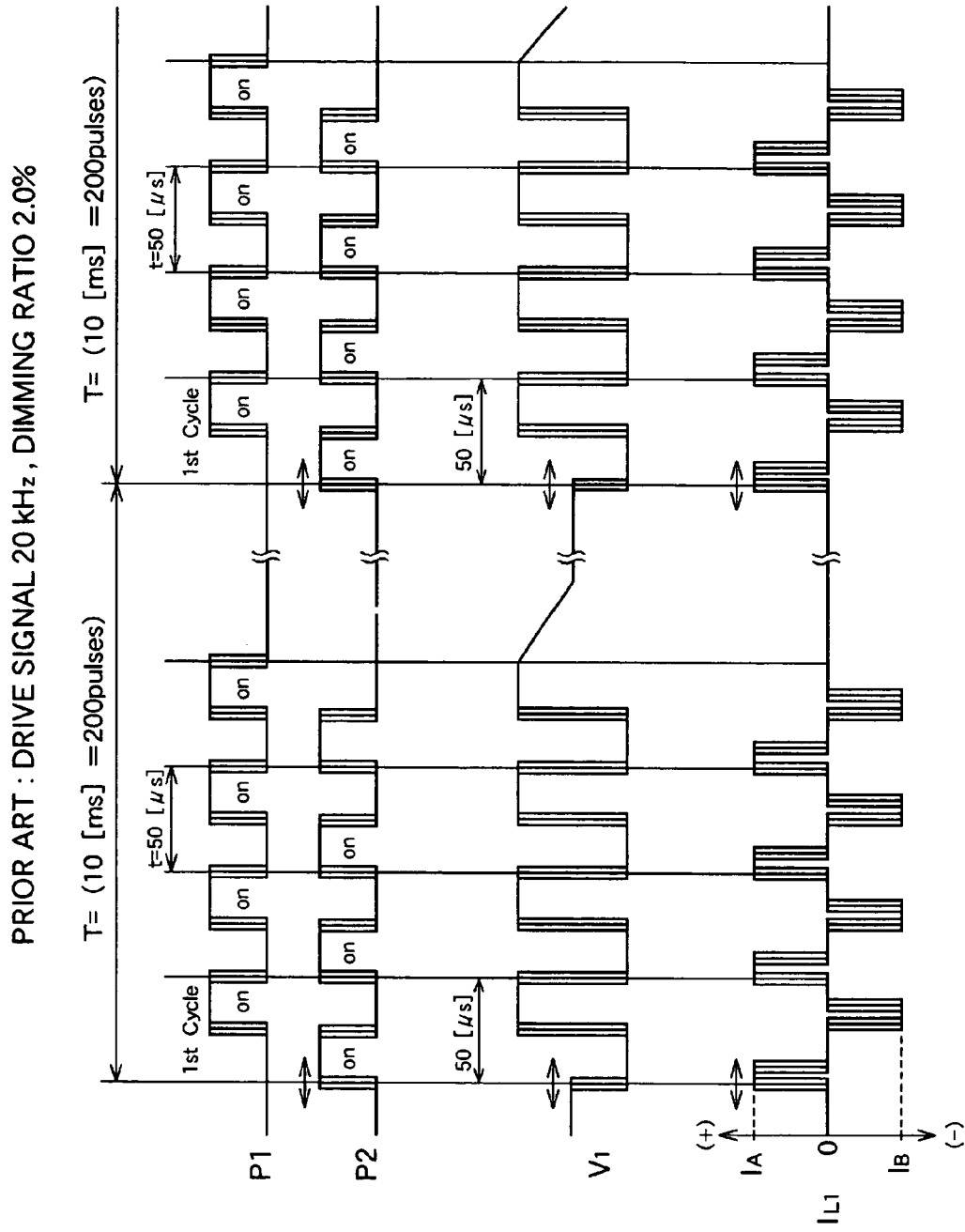
FIG. 8 is also a timing chart showing the waveforms of the drive signal P1 and P2 in the lighting device shown in FIG. 4 and FIG. 5.

The drive signals P1 and P2 generated under the precise control by the drive signal generating circuit 18 are supplied to inverter circuit 10 to perform ON/OFF control of the semiconductor switching elements S1 and S2, in a similar manner to the operation of the conventional inverter circuit 10 shown in FIG. 4 and FIG. 5.

As shown in FIG. 9, when semiconductor switching element S1 is turned OFF and S2 is turned ON, a current $I_A$ flows in a pass; DC source $V_{CC}$→capacitor C1→lamp drive transformer T1→circuit element Z2→semiconductor switching element S2→GND. On the contrary, when the semiconductor switching element S1 is turned ON and S2 is OFF, a current $I_B$ flows in a pass; DC source $V_{CC}$→semiconductor switching element S1→circuit element Z1→lamp drive transformer T1→capacitor C2→GND as shown in FIG. 10.

Thus, the voltage waveform V2 supplied from the secondary coil of the lamp drive transformer T1 to the fluorescent lamp 11 and the lamp current waveform $I_A$ flowing in the fluorescent lamp 11 have an ideal waveform respectively without any waveform or phase distortion as shown in FIG. 11. As a result, the dielectric barrier discharge type fluorescent lamp 11 can be operated in a stable state without generating the flickering.

Figure 12:
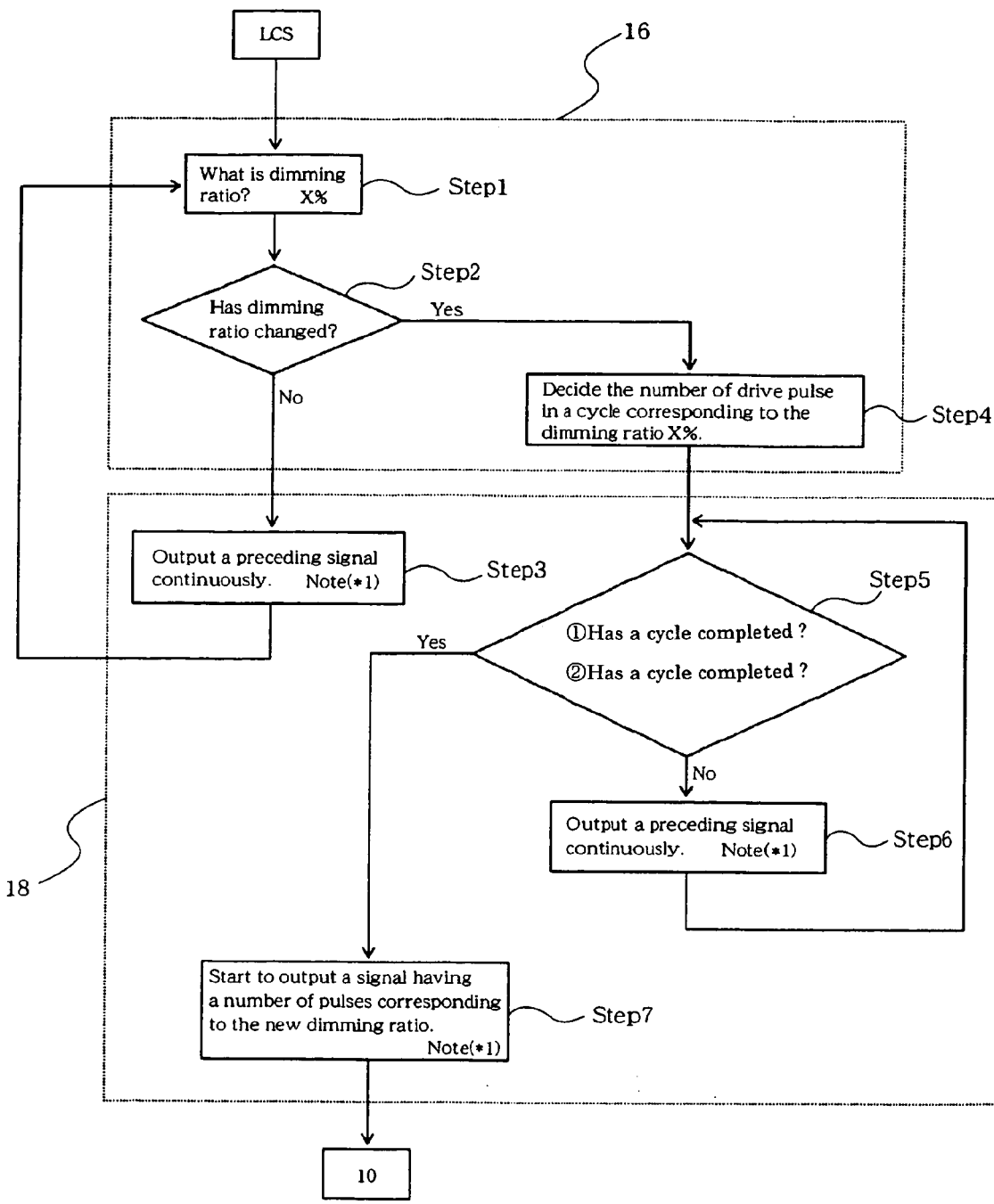
FIG. 12 is a flow chart for explaining an operation of a dimming control section 21, including a pulse number judging circuit 16 and the drive signal generating circuit 18 in FIG. 9 and FIG. 10, when it is formed by a micro computer.

FIG. 12 is a flowchart explaining the operation of the dimming control section 21 including pulse number judging circuit 16 and drive signal generating circuit 18 shown in FIG. 9 and FIG. 10, when it is formed by a micro computer. Here, each of blocks 16, 18 shown with a dotted line corresponds to the operation of the pulse number judging circuit 16 and drive signal generating circuit 18 shown in FIG. 9 and FIG. 10 respectively.

At step 1, dimming ratio is judged as X % from the inputted dimming control signal LCS. At step 2, the ratio X % is then compared with the dimming ratio X % designated by the light dimming control signal LCS which has been detected before, and is judged whether it has been changed or not. When the dimming ratio X % is found to have been not changed, the drive signal generating circuit 18 continues to output the drive signal P1 and P2 corresponding to the dimming ratio X % formerly detected.

When any change of dimming ratio X % has been found at step 2, the number of pulse Y of the drive signal P1 and P2 in 1 cycle period T of the dimming control signal LCS corresponding to the dimming ratio X % is decided, and is supplied to drive signal generating circuit 18 as the pulse number setting signal 17.

The drive signal generating circuit 18 receiving the pulse number setting signal 17 judges whether the following conditions are met or not at step 5;
(1) Has 1 cycle t of the drive signal P1, P2 completed?
(2) Has 1 cycle T of the dimming control signal LCS completed?

When they have not completed, and the preceding drive signals. P1 and P2 are outputted continuously at step 6. The processing at of step 5 and step 6 is repeated until the result of judge has become "Yes" at step 5.

When the result of the judge at step 5 becomes "Yes", output of drive signal P1 and P2 of the number of pulse Y corresponding to new dimming ratio X % at step 7. The drive signals P1 and P2 are supplied to inverter circuit 10.

In this manner, in the lighting device according to the embodiment of the present invention, imperfect waveform does not exist in the lamp drive waveform of each period, because each of the lamp drive voltage V2 and the current waveform $I_A$ are generated under the accurate control. That is, the phenomenon can be prevented from occurring that the first pulse waveforms or the last waveforms of each driving signals P1 and P2 in the dimming control signal cycle T include some lacking portions.

Also, in the lighting device according to the embodiment of the present invention, a stable lamp operation is realized without any flickering and is not inferior to mercury lamps, because the fluctuation of the start timing of the lamp drive waveform of V2 and $I_A$ in each period T of the dimming control signal is in the range from $-\frac{1}{2} \times t$ to $+\frac{1}{2} \times t$, and the fluctuation of the waveform of V2 and $I_A$ in each repetition cycle t of the lamp drive pulses P1 and P2 is in the range from $-\frac{1}{10} \times t$ to $+\frac{1}{10} \times t$.

The present invention is not limited to the embodiments described above, but a number of variations are available in the range of the present invention. For example, a full bridge type, a half bridge type, a push-pull type or a center-tap type inverter is applicable for the inverter circuit 10, that is, it does not depend on circuit types. Although the explanation was made in the case where the repetition frequency of the lamp drive signal P1 and P2 is 20 kHz, the repetition frequency of the dimming control signal LCS is 100 Hz in the HF source device 29 described above, the present invention is not limited to these frequencies.

Further, the fluorescent lamps which are operated by the lighting device according to the present invention are not limited to the external electrode type dielectric barrier discharge type discharge lamp or fluorescent lamp, but discharge lamps with other type of the electrodes are available.

The invention claimed is:

1. A lighting device for a dielectric barrier discharge lamp comprising:
   a pulse number judging circuit to which a dimming control signal is supplied as an input signal designating a dimming ratio of the dielectric barrier discharge lamp using a rare gas, for judging a number of pulses of drive signals per unit time corresponding to the dimming ratio from the dimming control signal, and for outputting a result as a pulse number setting signal;
   a drive signal generating circuit to which the pulse number setting signal outputted from the pulse number judging circuit is supplied, for outputting the drive signal pulses having a number of pulses per unit time designated by the pulse number setting signal; and
   an inverter circuit which generates an HF pulse voltage for driving the dielectric barrier discharge lamp,
   wherein the unit time is equal to a period T of a repetition cycle of the dimming control signal,
   wherein the drive signals are a pair of pulse signals each having substantially an equal repetition cycle and each having a different phase from each other by substantially 180°, and
   wherein a fluctuation of a start timing of a first pulse of the drive signals in a repetition period T of the dimming control signal for a repetition period t of the drive pulse signals confined in a range from $-\frac{1}{2} \times t$ to $+\frac{1}{2} \times t$.

2. A lighting device for a dielectric barrier discharge lamp according to claim 1, wherein a fluctuation of the drive signal pulses in a repetition period of the drive signals is confined in a range from $-\frac{1}{10} \times t$ to $+\frac{1}{10} \times t$.

3. A lighting device for a dielectric barrier discharge lamp according to claim 2, wherein the inverter circuit is one of either a full bridge type, half bridge type, push-pull type, or center tap type.

4. A lighting device for a dielectric barrier discharge lamp according to claim 1, wherein the pulse number judging circuit and the drive signal generating circuit are formed by a micro computer.

5. A lighting device for a dielectric barrier discharge lamp comprising:
   a pulse number judging circuit to which a dimming control signal is supplied as an input signal designating a dimming ratio of the dielectric barrier discharge lamp using a rare gas, for judging a number of pulses of drive signals per unit time corresponding to the dimming ratio from the dimming control signal, and for outputting a result as a pulse number setting signal;

a drive signal generating circuit to which the pulse number setting signal outputted from the pulse number judging circuit is supplied, for outputting the drive signal pulses having a number of pulses per unit time designated by the pulse number setting signal; and an inverter circuit which generates HF pulse voltage for driving the dielectric barrier discharge lamp, wherein the pulse number judging circuit and the drive signal generating circuit are formed by a micro computer, and wherein the pulse number judging circuit in the micro computer judges the dimming ratio from the inputted dimming control signal and decides a number of pulses Y in 1 cycle of dimming control signal corresponding to the judged dimming ratio, wherein the pulse number judging circuit transmits Y to the drive signal generating circuit as the pulse number setting signal, and wherein the drive signal generating unit judges whether one cycle t of the drive signals has completed entirely and whether one period T of the dimming control signal has completed entirely, and supplies the drive signals with Y number of pulses corresponding to the dimming ratio to the inverter circuit after each cycle has completed.

6. A lighting device for a dielectric barrier discharge lamp according to claim 5, wherein the unit time is the period T of the dimming control signal.

7. A lighting device for a dielectric barrier discharge lamp according to claim 6, wherein a fluctuation of a start timing of the drive signal pulses at the repetition period T of the dimming control signal for a cycle t of the drive signals is confined in a range from $-\frac{1}{2} \times t$ to $+\frac{1}{2} \times t$.

8. A lighting device for a dielectric barrier discharge lamp according to claim 7, wherein a fluctuation of the drive signal pulses in the cycle t of the drive signals is confined in a range from $-\frac{1}{10} \times t$ to $+\frac{1}{10} \times t$.

* * * * *